Figure 1:
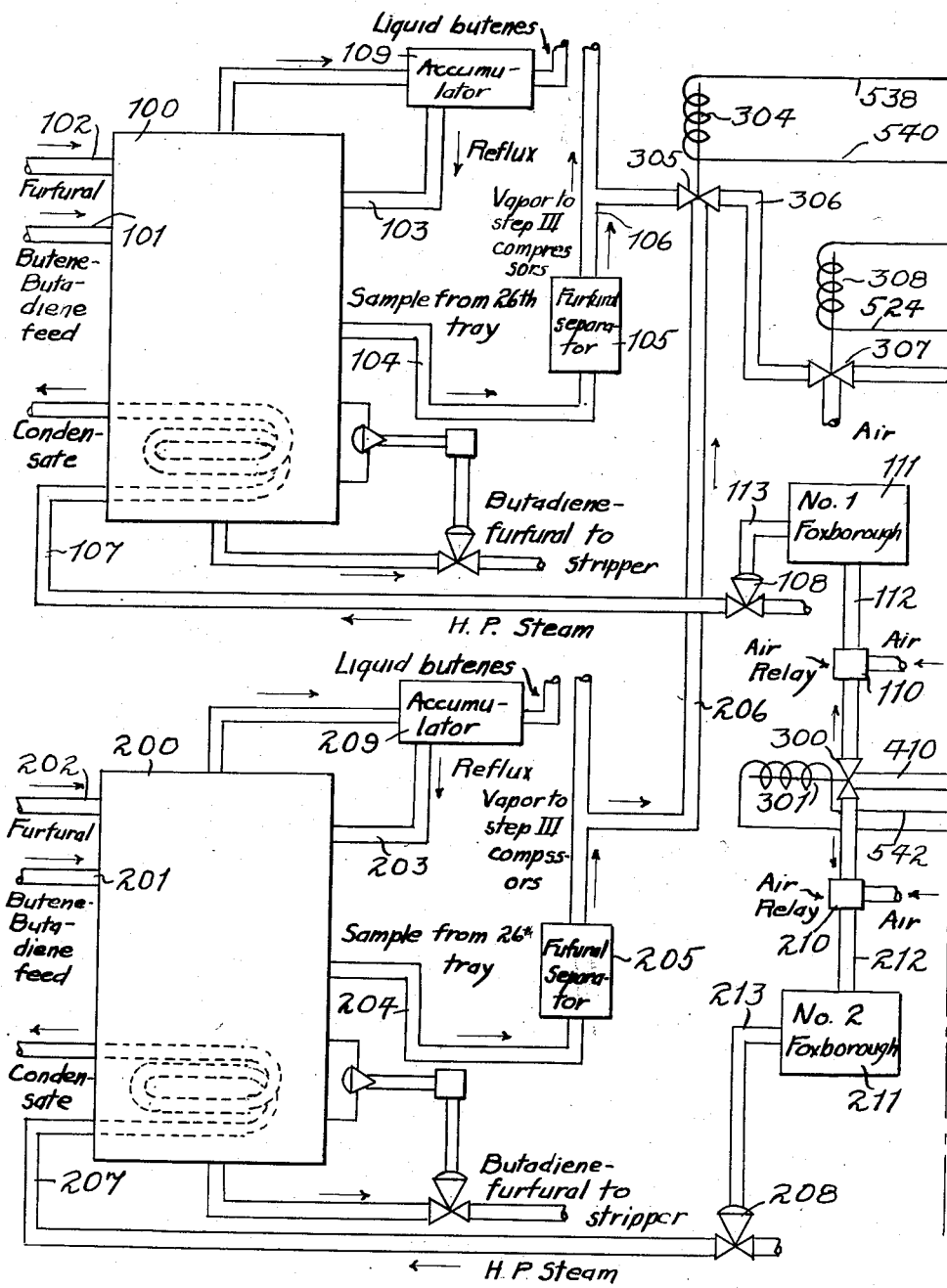

Dec. 7, 1954

C. H. MATHIS ET AL 2,696,464

METHOD AND APPARATUS FOR CONTROLLING THE SEPARATION
OF CONJUGATED DOUBLE BOND COMPOUNDS FROM
MULTICOMPONENT MIXTURES

Filed Jan. 27, 1949

3 Sheets-Sheet 1

INVENTOR.
Clyde H. Mathis
BY Maynard Van Perry
J. B. McCombs, Jr.

Darby & Darby
ATTORNEYS

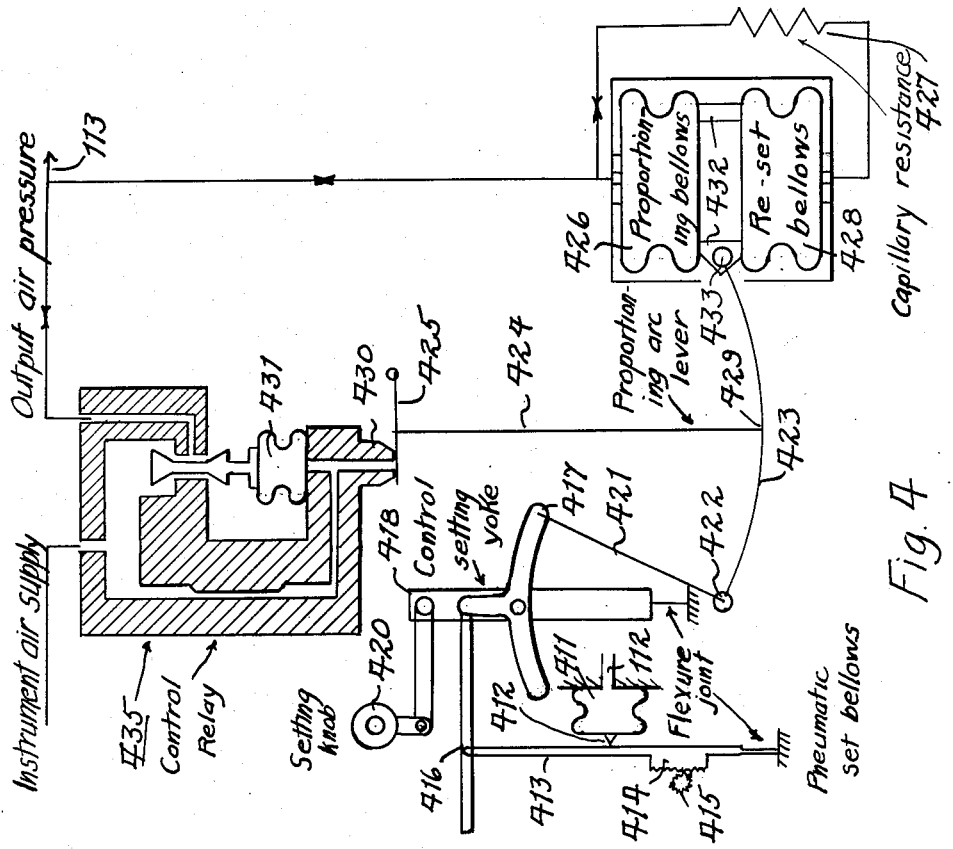
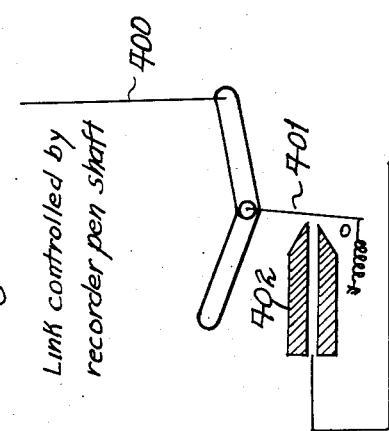

United States Patent Office 2,696,464
Patented Dec. 7, 1954

2,696,464

METHOD AND APPARATUS FOR CONTROLLING THE SEPARATION OF CONJUGATED DOUBLE BOND COMPOUNDS FROM MULTICOMPONENT MIXTURES

Clyde H. Mathis, Maynard Van Perry, and J. B. McCombs, Jr., Borger, Tex., assignors to Phillips Petroleum Company, a corporation of Delaware Application January 27, 1949, Serial No. 73,182

9 Claims. (Cl. 202—160)

The present invention relates to an improved process for the recovery, separation, or purification of organic compounds whose structural formula contains a conjugated system. More specifically this invention relates to an improved method and apparatus for the control of such a process.

This invention comprehends the separation of organic compounds whose structural formula contains a conjugated system of double bonds such as carbocyclic aromatics (as for example benzene, toluene, etc.), heterocyclic aromatics (for example furans, the pyridine series and the thiophene series) and acyclic compounds (for example butadiene, isoprene and pentadiene) from multicomponent mixtures. The invention is particularly applicable to compounds having an absorption band for radiation within the spectral range of from approximately 210 millimicrons to about 1000 millimicrons.

More particularly still, the invention pertains to the separation of multi-component hydrocarbon mixtures of the types indicated and containing hydrocarbons which have at least four carbon atoms per molecule from other components of a mixture.

In describing the invention, the separation of butadiene from other hydrocarbons having four carbon atoms per molecule will be considered, although as has been indicated above, this is but one example of many uses of the control process of our invention.

It is an object of the present invention to provide a method and apparatus for controlling the separation of compounds, the structural formula of which contains conjugated double bonds and which compounds exhibit the characteristic of absorbing radiation within the spectral range of from 210 millimicrons to 1000 millimicrons, from multi-component mixture.

It is another object of the invention to provide such a controlling method and apparatus in which the primary controlling element is an ultra-violet spectrophotometer.

It is another object of the invention to utilize the primary controlling element and associated equipment to control two extractive distillation columns thereby minimizing the amount of expensive apparatus utilized in the control system.

It is a further object of the invention to provide certain control elements which are pneumatically operated, and which are in turn controlled by the primary controlling element or spectrophotometer.

It is a still further object of the invention to utilize the control elements in such a manner that one of these controllers overrides and controls the operation of another in order that the range of controlled operation may be accurately determined.

It is a still further object of the invention to provide means for standardizing the primary controlling element for each operation so that the control exerted will be accurate and so that the control of each of the two otherwise separately performed processes will not be interfered with by the common utilization of the various controlling elements.

Figure 2:
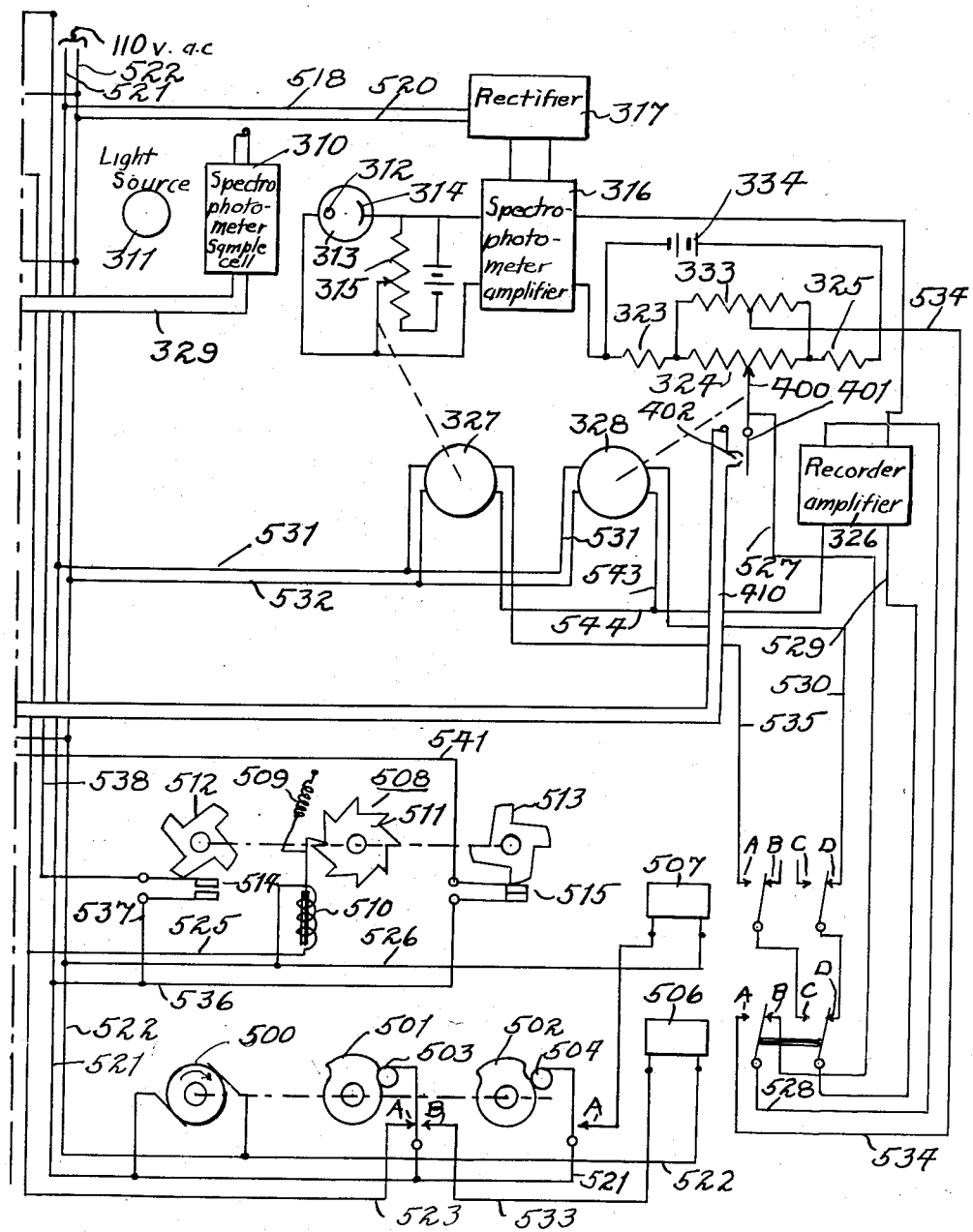

Other objects and features will appear when the following descriptions are considered in connection with the annexed drawings in which:

Figures 1 and 2 together form a schematic diagrammatic representation of two extractive distillation columns for the separation of butadiene from a mixture of $C_4$ hydrocarbons, together with the necessary pneumatic elements and electrical control elements for controlling the timing of the operations;

Figure 3 illustrates the essential portions of a pneumatic system, this being actuated by the electric instrument which in turn overrides and sets a pneumatic controller which exerts an overriding control in the system; and Figure 4 illustrates the essential portions of a second pneumatic controller which is effective to adjust the steam input to the distillation columns in accordance with the control exerted thereupon by the overriding instrument of Figure 3.

Extractive distillation columns

Referring now to the drawings, there are shown at 100 and 200 two extractive distillation columns utilized to absorb butadiene in furfural. These columns are of the well known bubble tray type and each in the particular instance shown contains 100 trays.

In a typical example, columns 100 and 200 receive feed streams through the pipes 101 and 201 which streams comprise a mixture of butadiene and other $C_4$ hydrocarbons in the vapor state. The feed rate to each of the columns 100 and 200 may be approximately 10,000 gallons per hour and a representative analysis of the feed stream is approximately as follows:

| | Per cent |
|---|---|
| Isobutane | 5 |
| Isobutylene | 5 |
| Butene-1 | 38 |
| Butadiene | 25 |
| Normal butane | 15 |
| Butene-2 (high boiling) | 10 |
| Butene-2 (low boiling) | 2 |

This feed stock flows upwardly countercurrent to a furfural stream admitted at the top of the columns through the pipes 102 and 202. The furfural streams amount to about 90,000 gallons per hour each and enter each column at about 135° F. Each column is also supplied with a hydrocarbon reflux stream entering the column through pipes 103 and 203 respectively which amounts to about 10,000 gallons per hour each. The columns operate at about 50 lbs. per square inch gage with a kettle temperature of about 310° F. The furfural flowing downwardly through the columns dissolves or absorbs the butadiene selectively and thus the furfural withdrawn from the bottom of the column contains substantially all the butadiene present in the feed stream.

The temperature of the extractive distillation columns 100 and 200 is controlled by controlling the admission of steam through the pipes 107 and 207 respectively, the control being exerted through the mediums of valves 108 and 208 respectively. The valves 108 and 208 are controlled pneumatically in a manner which will be later described.

The description given above relates entirely to a well known method of separating the butadiene from other hydrocarbons in a bubble tray column by means of furfural absorption. Our invention provides a control for the operation of these two extractive distillation columns, the basic operation of which will now be described. A vapor stream amounting to above 30 cubic feet per day is withdrawn from the vapor space at the 26th tray of each column 100 and 200.

This vapor stream is of course contaminated with furfural which must first be removed for the successful operation of our invention. In order to accomplish this, the sample from the 26th tray of columns 100 and 200 is passed through pipes 104 and 204 respectively to furfural separators 105 and 205. These separators comprise vessels filled with ceramic pebbles and to which fresh water is continually admitted at a rate of two to three gallons a minute, the water level being maintained within each vessel by means of a suitable liquid level control.

The water washed hydrocarbon vapor stream passes from the furfural separators to a trap or scrubber (not shown) in order to remove any free and entrained water. About 10% to 15% of the sample of the vapor stream saturated with water at the ambient temperature flows from each trap through a pipe 106 or 206 to a valve 305 controlled by solenoid 304 as will be described, and then to a second valve 307 controlled by a solenoid 308. The valve 307, as will later appear, serves to admit a sample from either one of the two columns 100 or 200 to the sample cell 310 of a spectrophotometer.

Spectrophotometer

The spectrophotometer utilized is a "Beckman" ultraviolet spectrophotometer of a well known and commercially available type. For this reason only the essential portions thereof will be described. The hydrocarbon vapor stream enters the sample cell or absorption cell indicated at 310, which cell is about one centimeter square and two inches long in the particular instance. The sample cell is retained in an iron block which serves as a heater, the temperature being thermostatically maintained at approximately 117° F.

A light source indicated at 311 supplies light in the spectral range of between 220 and 350 millimicrons. For this purpose a hot cathode hydrogen discharge tube is suitable. By means of an optical system (not shown) the light source transmits light to the sample in the sample cell 310, the unabsorbed portion thereof being transmitted through the cell and striking the cathode 314 of a photosensitive tube 313 which may be a cesium oxide tube.

It will be seen that light in the specified spectral range is absorbed in the sample cell 310 to a degree depending upon the concentration of butadiene. With the particular instrument considered when there is no light striking the cathode 312 of the phototube 313 a current of approximately $10^{-10}$ amp. flows across the tube to the anode 314. When light is transmitted to the cathode 312 the additional current flowing is of the order of $10^{-13}$ amp. By this method the amount of light energy transmitted through the sample in the sample cell 310 is converted to electrical energy. The variation in current output produces a change in potential across a resistance 315 which resistance has a value in the order of 2000 megohms. The potential drop across the resistance 315 is transmitted to the input grid of the input tube of an amplifier 316 which is supplied with power in the normal manner from a rectifier 317 connected by means of conductors 518 and 520 to a source of 110 volt 60 cycle alternating current power represented by the conductors 521 and 522.

Standardizing motor

As has been indicated the spectrophotometer is standardized by adjusting the output from the phototube 313 to a predetermined value when air is admitted to the sample cell 310. This adjustment is effected by moving a slider along the resistance 315, which resistance constitutes in effect a slide-wire potentiometer. This movement is effected by means of a motor 327 which motor is of the type frequently known as a four pole motor. Such motors have two fields, one of which is in the present instance supplied continuously with 110 volt alternating current over conductors 531, 532. The other field winding receives a series of direct current pulses from the recorder amplifier 326 which recorder amplifier incorporates a converter or chopper. The pulses are conveyed to the motor 327 over a circuit which will be later described in connection with the timing apparatus.

The pulses are of such a wave form as to duplicate a sine curve and therefore are in essence alternating current. Since the current from the amplifier 326 will be out of phase with the current in the other field, it is apparent that the pulses applied from the recorder amplifier will produce rotation of the motor and balance the circuit at which time no current will flow. At the time when the sample cell 310 contains air, and the standardizing motor is adjusting the input to the spectrophotometer amplifier 316, the input of the recorder amplifier 326 is taken from the midpoint of a resistance 333 which is itself connected across a potentiometer 324 shortly to be described.

Electro-pneumatic recorder controller

There is utilized in our invention an electro-pneumatic recorder controller which comprises a motor 328 generally similar to the motor 327 (which may also be incorporated in the controller). The recorder controller may, for example, be of the type known as a "Brown Air-O-Line" recorder. Likewise incorporated in the recorder controller is the potentiometer including resistance 323 and 325, potentiometer 324 and a source of direct current 334. The pen arm of the recorder controller is moved under control of the motor 328 which is of the same type as motor 327. This pen arm is connected by means of a link 400, see Figure 3, with a flapper 401 operating on a bleed valve or nozzle 402. Depending upon the amount of air bled through the nozzle 402, the bellows 404 of a pilot valve 408 may be more or less distended. The pilot valve is supplied with control air through the inlet passage 409 and this air is in turn controlled by means of the valve flapper 403 to produce a regulated pressure at the exit passage 405.

The electropneumatic controller above described overrides the system and delivers air at a controlled pressure to one of two final control elements to be described hereinafter.

Motor 328 is supplied with alternating current over the conductors 531 and 532 and the second winding of this motor is, when a sample is present in the spectrophotometer cell 310, supplied with current from the recorder amplifier 326. The recorder amplifier is, while a sample is in the sample cell, connected across the output terminals of the spectrophotometer amplifier 316, the potentiometer 324 being in series with one side of the spectrophotometer amplifier output. The connection to the recorder amplifier input is through certain relays constituting part of the timing devices which will be described.

Pneumatic control instruments

As stated above the Brown Air-O-Line recorder output from the passage 405 of the pilot valve is utilized as an overriding control air stream and is supplied through the pipe 410 to the solenoid operated valve 300 and thence through air relays 110 or 210 to one of the two pneumatic controllers 111 or 211. These two controllers are identical and a schematic showing of basic elements thereof is given in Figure 4. The particular instrument illustrated in Figure 4 is known as a "Foxboro Stabilog" controller although other instruments of this type could readily be substituted.

In this device as modified for the particular usage a pneumatic set bellows indicated at 411 is supplied with air as has been indicated through the pipe 112 (considering that the description refers especially to the condition when the number 1 "Foxboro 111" is in use). The bellows of this device is fixed at one side, the opposite side terminating in a knife edge 412 which bears against a flexible arm 413. The length of the effective portion of the arm 413 can be adjusted by means of the rack and pinion 414, 415. The upper end of lever 413 is connected by means of a link 416 (which also connects to the pen arm of the instrument, not shown) to one arm of a reversing bell crank 417 which bell crank is mounted upon a control setting yoke 418.

Yoke 418 is mounted by means of a flexure joint as shown and can be moved to modify the range of setting by means of the setting knob indicated at 420. Extending downwardly from the reversing bell crank 417 is the link member 421 which is hinged at 422 to the proportioning arc lever 423. By means of a fulcrum adjustment link 424 the movement of the proportioning arc lever 423 is transmitted to a flapper 425 associated with the control relay 435. Control relay 435 bleeds air to or from the proportioning bellows 426 (and through the capillary resistance 427 also from the reset bellows 428) in the right amounts to maintain the correct air pressure in the output line 113 and in the proportioning bellows. As a result the arc lever 423 rotates about a proportioning fulcrum indicated at 429 as a fixed pivot.

The balanced position of the flapper 425 occurs with the flapper almost touching the nozzle 430 of the relay 435 and a small amount of air escaping therefrom. As the flapper approaches the nozzle, pressure builds up in the relay bellows 431 and the relay 435 therefore passes more air to the proportioning bellows 426. This results in lowering the proportioning arc lever 423 and tends to move the flapper 425 away from the nozzle.

When an upset has occurred and the proportioning action above described has taken place it will be apparent that the increased pressure in the proportioning bellows immediately starts to bleed through the capillary 427 to the reset bellows 428, which bellows is equal in area to and opposes the motion of the proportioning bellows 426. However, the proportioning bellows must necessarily remain in the expanded position as long as the element 413 remains deflected due to the fact that the arc lever 423 rotates about a fixed pivot. As a result the pressures in both the proportioning bellows 426 and the reset bellows 428 will rise with a fixed pressure differential between them, until such time as the control valve is sufficiently opened and the controlled process reacts to move the pneumatic set bellows 411 and the reversing bell crank 417 back to their original balanced position. At this time a different pressure may exist in the controlled line 113, the proportioning bellows 426 and the reset bellows 428, than that which existed before the upset. It should be noted that the proportioning bellows 426 and the reset bellows 428 are interconnected at their respective lower and upper ends by means of a light framework 432 so that the pivot point 433 moves vertically upwardly or downwardly in accordance with the pressures present in the bellows 426 and 428.

By means of the "Foxboro Stabilog" Recorder described above or its equivalent, the output air pressure in the line 113 or the line 213 as the case may be is controlled and the steam valve 108 or 208 thereby operates to maintain the heat input to the extractive distillation columns 100 and 200 respectively at such levels as to assure substantially no butadiene in the output from these columns to the accumulators 109 and 209, respectively.

*Timing mechanism*

As has been indicated, a single spectrophotometer and a single electropneumatic control device is utilized to control the operation of two extractive distillation columns. Furthermore, each controlling operation or cycle includes a relatively short period during which air is admitted to the sample cell 310 of the spectrophotometer and a relatively long period during which a sample from one of the two distillation columns is admitted to the sample cell.

It is essential that when the sample in the sample cell 310 has been derived from one of the two extractive distillation columns, for example, column 100, the control of steam be exerted with respect to the pipe leading to that column. For the purposes above mentioned, timing devices are provided which timing devices together with certain relays operated thereby are illustrated schematically in Figure 2.

As seen in this figure, an electrically operated clock 500 has provided on its shaft two cams 501 and 502 which cams cooperate with the cam followers 503 and 504 respectively to open and close associated contacts 501A and B and 502A. These contacts in turn are effective to control the operations of two relays 506 and 507. In addition, there is provided a sequence switch generally designated 508 which includes the usual stepping magnet 510 and its ratchet 511 as well as two cams 512 and 513 driven by the ratchet wheel 511 and effective to operate the contacts 514 and 515 respectively.

These various relays and cam controlled contacts are effective to connect the recorder amplifier 326 to the motors 327 and 328 at the proper times and to likewise effect energization and deenergization of the solenoids 304, 308 and 301 of the solenoid control valves 305, 307 and 300 respectively. The exact operation of the various devices heretofore described can best be understood when a description of a complete cycle of operation is given.

*Operation*

In describing the operation we will consider the timing devices as being in the position shown in Figure 2. At this time the solenoid 510 is energized and the contacts 515 closed. At the same time the position of cams 501 and 502 is such that contact 501A is closed, 501B is open and contact 502A is open. A circuit is thus completed from conductor 521 through closed contact 501A and thence over conductor 523 to the winding of solenoid 308 and thence through conductor 524 back to conductor 522 which is the other terminal of the power circuit.

Likewise closure of contacts 501A completes a circuit through conductor 523 and, conductor 525, to the solenoid 510 of the stepping switch 508 and thence through conductor 526 to conductor 522. As a result of this circuit solenoid 510 has been energized and has positioned the sequence switch 508 in the position shown.

Energization of solenoid 308 causes operation of valve 307 to pass sample flowing in line 306 to the sample cell 310. At this time relays 506 and 507 are deenergized and the input to the recorder amplifier 326 is through a portion of the potentiometer 324. The circuit may be traced from the pen arm controlled slider 400 through conductor 527, lefthand armature and contact B of relay 506, and conductor 528 to input side of recorder amplifier 326. The output of the recorder amplifier flows through conductor 529, righthand armature and contact D of relay 506, righthand armature and contact D of relay 507, and conductor 530 to the second winding of recorder motor 328, thence through that winding and over conductors 543 and 544 to the other side of the output of the recorder amplifier 326.

The circuit conditions just above described are those pertaining as the cycle of operation of the devices nears its end. During this period a sample from extractive distillation column 200 is flowing through the sample cell 310, Figure 2, and the control exerted by the spectrophotometer through its amplifier 316 and the recorder amplifier 326 and pneumatic controller 211 is effective to adjust the pneumatically operated valve 208 to permit a flow of steam in the pipe 207 to maintain the proper heat input to column 200.

Shortly after this, the clock 500 drives the cams 501 and 502 to such a position that cam roller 503 is on the high point of its cam 501 causing contacts 501A to open and 501B to close. The opening of contacts 501A causes deenergization of solenoid 308, thus operating valve 307 and permitting air to flow through pipe 329 to the sample cell 310. The opening of contacts A also causes deenergization of the solenoid 510 of stepping switch 508. This is without effect at the moment since the spring 509 merely moves the stepping pawl over the teeth of ratchet 511.

Closure of contacts 501B completes a circuit from conductor 521 through those contacts, thence over conductor 533 to the winding of relay 506 and thence to the other side of the power circuit at conductor 522. Relay 506 thus operates, causing its contacts A and C to close and B and D to open. The opening of contacts B and closure of contacts A causes the input to the recorder amplifier to be taken from the center tap of resistor 333 instead of from the slider 400 of potentiometer 324. The circuit now extends from the mid-tap of resistor 333 over conductor 534 to contact A of relay 506 thence through the lefthand relay armature and conductor 528 to the input side of the recorder amplifier 326. Also, the output circuit from the recorder amplifier extends over conductor 529 through the righthand armature of relay 506 through contact C of that relay and through the lefthand armature to contact B of unoperated relay 507 where the circuit terminates at this time.

A slight further rotation of clock 500 causes closure of contact 502A and completes a circuit from conductor 521 through contact 502A to relay 507 and through conductor 526 to conductor 522. This causes the circuit just previously described to be extended from the lefthand armature of relay 507 through contact A of that relay and over conductor 535 to the second winding of standardizing motor 327 and through that winding and conductor 544 to the other side of the output of the recorder amplifier 326.

Motor 327 now operates to adjust the position of the slider on potentiometer 315 to thereby adjust the input to the spectrophotometer amplifier to balance the amplifier and to thus care for any changes which may have occurred, for example, by dirtying of the window of the sample cell or by change in the light source or otherwise. In other words, the system is now set so that the conditions present will be indicated as light transmission of 100% of the light originating in the light source 311. This standardizing action takes place during a period of time of approximately one minute, at the end of which the follower 503 leaves the high portion of the cam 501.

At this time contact 501B opens and contact 501A closes. Opening of contact 501B brings about deenergization of relay 506 which in turn causes completion of a circuit leading through contact B and D of that relay. The circuit through contact B has previously been traced and leads from the slider 400, to the input of the recorder amplifier. The circuit through contact D of relay 506 leads from the output of the recorder amplifier but is broken at contact C of relay 507 which is now energized. Closure of contacts 501A causes energization of solenoid 308 over a circuit previously described and likewise energization of solenoid 510 of the stepping or sequence switch 508 over a previously described circuit. Energization of solenoid 308 causes the operation of valve 307 to thereby connect pipe 306 to pipe 329 and to permit the sample from one of the two columns 100 or 200 to flow to the sample cell 310. The energization of solenoid 510 causes a stepping of the switch 508 permitting contacts 515 to open and contacts 514 to close.

Closure of contacts 514 completes a circuit from conductor 521 over conductors 536 and 537 through contacts 514, thence over conductor 538 to solenoid 304 and thence over conductor 540 to the other side of the power circuit at conductor 522. The opening of contacts 515 causes deenergization of the solenoid 301 associated with valve 300. The circuit which is opened by this opening of contacts 515 extends from conductor 521, over conductor 536, through contacts 515, thence over conductors 541 to solenoid 301 and by way of conductor 542 to the opposite side of the power line at conductor 522.

Energization of solenoid 304 operates valve 305 controlled thereby to admit a sample from the furfural separator 105 through pipe 106 and into pipe 306 and through valve 307 and pipe 329 to the sample cell 310. Deenergization of solenoid 301 causes the output air from the Brown Air-O-Line recorder (through the pipe 410) to pass through valve 300 into air relay 110 and thence to be effective to control the operation of the pneumatic controller 111 and therefore the position of the valve 108.

Following this, the follower 504 of cam 502 leaves the high portion of that cam and thereby causes opening of contact 502A. This in turn results in deenergization of relay 507 and thus extends the circuit from conductor 529 through the righthand armature and contact D of relay 507 and thence over conductor 530 to the second winding of the recorder motor 328 which then operates to balance the system and to adjust in accordance with the percentage of butadiene present in the sample cell 310. This operation continues for approximately four minutes.

At the end of this four minute period the clock and the cams 501 and 502 controlled thereby are again in the position shown in Figure 2. Shortly afterward, contacts 501A open and 501B close. The opening of contacts A causes deenergization of solenoid 308 and also deenergization of the solenoid or stepping magnet 510 of switch 508. Deenergization of solenoid 308 operates valve 307 to again admit air through pipe 329 to the spectrophotometer sample cell 310. Deenergization of magnet 510 is without effect other than that the stepping pawl is permitted under urge of spring 509 to move over the ratchet teeth in preparation for the next energization of the magnet 510. Closure of contacts 501B brings about energization of relay 506 in the same manner as has been previously described and thus connects the recorder amplifier input to the center tap of the resistor 333 and prepares for connecting the recorder amplifier to the second winding of the standardizing motor 327.

Next, the cams are advanced to a position where follower 504 of cam 502 causes closure of contacts 502A and consequent energization of relay 507. This energization of relay 507 completes the connection between the recorder amplifier output and the winding of standardizing motor 327 and the spectrophotometer amplifier is then adjusted with air in the sample cell in the manner previously described.

This action continues for approximately one minute, at the end of which time the follower 503 leaves the high portion of cam 501 and contacts 501B are opened and contacts 501A closed. The closure of contacts 501A causes energization of solenoids 308 and 510. The energization of solenoid 308 operates valve 307 to again connect pipes 329 and 306. Energization of solenoid 510 operates stepping switch 508 causing opening of contacts 514 and closure of contacts 515. The opening of contacts 514 brings about deenergization of solenoid 304 and thus connects pipe 206 with pipe 306, so that the sample flowing to the cell 310 is one from furfural separator 205. Closure of contacts 515 causes energization of solenoid 301 thereby connecting the pipe 410 with the pneumatic controller 211 through the air relay 210. The output from the pneumatic controller 211 passes through the pipe 213 and governs the operation of valve 208 and hence, the amount of steam flowing through pipe 207 to extractive distillation column 200.

The opening of contacts 501B results in deenergization of relay 506 and thus switches the input to the recorder amplifier 326 from the center tap of resistances 333 to the slider 400 on potentiometer 324. At the same time the deenergization of relay 506 prepares for transferring the output circuit of the recorder from standardizing motor 327 to recorder motor 328. However, for the moment this circuit is open at contact C of relay 507.

After another increment of operation of the clock 500, contact 502A is opened causing deenergization of relay 507 and completing the circuit from the recorder amplifier through contact D of relay 507 to the second winding of the recorder motor 328. During the ensuing period of approximately four minutes, the system exerts a control on valve 208 to properly adjust the steam passing through pipe 207 and through the coil in extractive distillation column 200 to assure that the percentage of butadiene present in the sample derived from the 26th tray of the column be that desired. At the end of the four minute period the cams 501 and 502 as well as sequence switch 508 are in the position in which they were originally described, and the operations just above described are repeated.

It will of course be understood that different types of timing devices and different types of spectrophotometers, recorders and controllers may be utilized to effect the cycling operations hereinabove described. It will also be understood that these timing and control devices may be arranged to control the operation of more than two distillation columns or like devices. Further, although many of the advantages of our invention are derived through the utilization of the timing and switching devices described, nevertheless others of the advantages may be secured through the utilization of the spectrophotometer, electropneumatic and pneumatic controlling devices only without the switching arrangements for shifting the control from one extractive distillation column to another.

The benefits derived from such switching are primarily the utilization of a single spectrophotometer and a single overriding control instrument such as the "Brown Air-O-Line" recorder mentioned hereinabove to control two or more extractive distillation columns.

While we have disclosed our invention as applied to the separation of butadiene from a mixture of $C_4$ hydrocarbons by extractive distillation, it is to be understood that the invention may be advantageously applied to a variety of separation processes in which an organic compound containing a conjugated system of double bonds is being separated from mixtures containing the same. The invention may be used for the control of distillation or fractionation processes in which such an organic compound is being separated from a mixture of relatively close boiling components and in which the ordinary methods of control, such as the temperature at a selected point in the fractionation column, are not suitable for controlling the process. The invention may also be applied equally well to liquid-liquid extraction processes in which an organic compound whose structural formula contains a conjugated system of double bonds is separated from a mixture containing the same, comprising passing said mixture as a liquid into intimate contact with a solvent which is selective for the organic compound which is to be separated. It is well known that diolefins such as butadiene and isoprene, or aromatics, such as benzene or toluene, may be separated from mixtures containing the same by a liquid-liquid extraction process in which furfural is used as a selective solvent. The organic mixture may be contacted with the selective solvent in numerous types of extraction zones with a packed column being a well known means. In such a process, a selective solvent, such as furfural is passed into the upper portion of the liquid-liquid extraction column and a liquid mixture containing an organic compound containing a conjugated system of double bonds, such as butadiene, is passed into an intermediate point of the column. Butadiene is absorbed by the furfural and the furfural stream containing the absorbed butadiene is withdrawn from the column as the extract while the unabsorbed components of the mixture pass from the top of the column as a raffinate. In such an operation, it is usually desirable to return a portion of the extract phase which in this case would be butadiene to a lower portion of the column in order to desorb the undesired components of the mixture from the furfural and to enrich the furfural with the desired organic compound which in this example would be butadiene. In this process, our invention may be utilized to control the rate of return of such a reflux stream so as to maintain a predetermined content of butadiene at a selected point in the column. In this application, a liquid sample is withdrawn from the liquid-liquid extraction column and is water washed to remove furfural and the hydrocarbon liquid phase is vaporized with a portion of this vapor being passed to the sample cell of the spectrophotometer.

While we have described a preferred embodiment of our invention, it will be understood that the description heretofore given was solely for the purpose of illustration and, therefore, we wish not to be limited thereby but on the other hand to be limited solely by the claims granted us.

What is claimed is:

1. In a system for controlling the separation of a compound containing conjugated double bonds from a mixture by means of extractive distillation, in combination, means for taking a sample of the mixture from a selected intermediate portion of the distillation means, a spectrophotometer comprising a source of ultra-violet light, a cell to which said sample is supplied, and a photocell; means for admitting air and a sample alternately to said spectrophotometer sample cell; timing means for operating said admitting means; an electropneumatic control comprising a pair of adjustable potentiometers and electropneumatic control means for adjusting one of said poentiometers while air is admitted to said sample cell and for adjusting the other of said potentiometers when a sample is admitted to said sample cell to thereby balance the instrument; and means under control of said electropneumatic means for controlling the heat input to the extractive distillation means.

2. In a system for controlling the separation of a compound containing conjugated double bonds from a mixture by means of extractive distillation, in combination; means for taking a sample of the mixture from a selected portion of the distillation means; a spectrophotometer comprising a source of ultraviolet light, a cell to which said sample is supplied, and a photocell; means for admitting air and a sample alternately to said spectrophotometer sample cell; timing means for operating said admitting means; an eletropneumatic control comprising a pair of adjustable potentiometers, and means for adjusting one of said potentiometers, while air is present in said sample cell and for adjusting the other of said potentiometers when a sample is present in said sample cell to thereby balance the instrument; electropneumatic means under control of said measuring means for regulating the pressure in a control air line in accordance with the operation of said measuring means, said electropneumatic means acting as an overriding control; and pneumatic means connected to said air line and operable in accordance with the regulated air pressure from said electropneumatic means, said pneumatic means being operable to regulate the heat input to the extractive distillation means.

3. In a system for controlling the separation of a compound containing conjugated double bonds from a mixture by extractive distillation, in combination; a plurality of extractive distillation columns; means for taking a sample of the mixture from a selected intermediate portion of each distillation column; a spectrophotometer comprising a source of ultraviolet light, a cell to which said sample is supplied, and a photocell; means for admitting air and a sample alternately to said spectrophotometer sample cell; timing means for operating said admitting means; timing means for directing samples from said plurality of extractive distillation columns successively to said air-sample admitting means at a time when the last mentioned means is set to admit a sample to the cell; an electropneumatic control comprising a pair of adjustable potentiometers and means for adjusting one of said potentiometers while air is admitted to said sample cell and for adjusting the other of said potentiometers when a sample is admitted to said sample cell to thereby balance the instrument; and means under control of said electropneumatic means for controlling the heat input to the corresponding extractive distillation column.

4. In a system for controlling the separation of a compound containing conjugated double bonds from a mixture by extractive distillation, in combination; a plurality of extractive distillation columns; means for taking a sample of the mixture from a selected intermediate portion of each distillation column; a spectrophotometer comprising a source of ultraviolet light, a cell to which said sample is supplied, and a photocell; means for admitting air and a sample alternately to said spectrophotometer sample cell; timing means for operating said admitting means; timing means for directing samples from said plurality of extractive distillation columns successively to said air-sample admitting means at a time when the last mentioned means is set to admit a sample to the cell; an electropneumatic control comprising a pair of adjustable potentiometers and means for adjusting one of said potentiometers while air is admitted to said sample cell and for adjusting the other of said potentiometers when a sample is admitted to said sample cell to thereby balance the instrument; means under control of said electropneumatic means for regulating the pressure in a control air line during measuring of a sample in said spectrophotometer, said electropneumatic means acting as an overriding control; and pneumatic means connected to said control air line and operable in accordance with the regulated air pressure from said electropneumatic means, said pneumatic means being operable to regulate the heat input to the extractive distillation column from which the then measured sample originated.

5. In a system for controlling the separation of a butadiene from a mixture of hydrocarbons by extractive distillation, in combination, means for taking a sample of the mixture from a selected portion of the distillation means, a spectrophotometer comprising a source of ultraviolet light, a cell to which said sample is supplied, and a photocell; means for admitting air and a sample alternately to said spectrophotometer sample cell; timing means for operating said admitting means; an electropneumatic control connected to said spectrophotometer comprising a pair of adjustable potentiometers and means for adjusting one of said potentiometers while air is present in said sample cell and for adjusting the other of said potentiometers when a sample is present in said sample cell to thereby balance the instrument; and means under control of said electropneumatic means for controlling the heat input to the extractive distillation means.

6. In a system for controlling the separation of a butadiene from a mixture of hydrocarbons by extractive distillation, in combination; means for taking a sample of the mixture from a selected intermediate portion of the distillation means; a spectrophotometer comprising a source of ultraviolet light, a cell to which said sample is supplied, and a photocell; means for admitting air and a sample alternately to said spectrophotometer sample cell; timing means for operating said admitting means; an electropneumatic control comprising a pair of adjustable potentiometers, and means for adjusting one of said potentiometers while air is present in said sample cell and for adjusting the other of said potentiometers when a sample is present in said sample cell to thereby balance the instrument; electropneumatic means under control of said measuring means for regulating the pressure in a control air line in accordance with the operation of said measuring means, said electropneumatic means acting as an overriding control; and pneumatic means connected to said air line and operable in accordance with the regulated air pressure from said electropneumatic means, said pneumatic means being operable to regulate the heat input to the extractive distillation means.

7. In a system for controlling the separation of a butadiene from a mixture of hydrocarbons by extractive distillation, in combination; a plurality of extractive distillation columns; means for taking a sample of the mixture from a selected intermediate portion of each distillation column; a spectrophotometer comprising a source of ultraviolet light, a cell to which said sample is supplied, and a photocell; means for admitting air and a sample alternately to said spectrophotometer sample cell; timing means for operating said admitting means; timing means for directing samples from said plurality of extractive distillation columns successively to said air-sample admitting means at a time when the last mentioned means is set to admit a sample to the cell; an electropneumatic control comprising; a pair of adjustable potentiometers and means for adjusting one of said potentiometers while air is admitted to said sample cell and for adjusting the other of said potentiometers when a sample is admitted to said sample cell to thereby balance the instrument; and means under control of said electropneumatic means for controlling the heat input to the corresponding extractive distillation column.

8. In a system for controlling the separation of a butadiene from a mixture of hydrocarbons by extractive distillation, in combination; a plurality of extractive distillation columns; means for taking a sample of the mixture from a selected portion of each distillation column; a spectrophotometer comprising a source of ultraviolet light, a cell to which said sample is supplied, and a photocell; means for admitting air and a sample alternately to said spectrophotometer sample cell; timing means for operating said admitting means; timing means for directing samples from said plurality of extractive distillation columns successively to said air-sample admitting means at a time when the last mentioned means is set to admit a sample to the cell; an electropneumatic control comprising a pair of adjustable potentiometers and means for adjusting one of said potentiometers while air is present in said sample cell and for adjusting the other of said potentiometers when a sample is present in said sample cell to thereby balance the instrument; means under control of said electropneumatic means for regulating the pressure in a control air line during measuring of a sample in said spectrophotometer, said electropneumatic means acting as an overriding control; and pneumatic means connected to said control air line and operable in accordance with the regulated air pressure from said electropneumatic means, said pneumatic means being operable to regulate the heat input to the extractive distillation column from which the then measured sample originated.

9. An improved process for the separation of butadiene from a mixture of $C_4$ hydrocarbons containing the same by extractive distillation which comprises; passing a mixture of said $C_4$ hydrocarbons as feed to each of a plurality of extractive distillation columns; passing a proportioned stream of furfural into the upper section of each column; withdrawing a vapor mixture of $C_4$ hydrocarbons containing a lesser amount of butadiene than is in said feed from the top of each column; condensing at least a portion of each of said vapor mixtures and returning the condensate to the top of each column as a reflux; withdrawing a first vapor sample from a selected point in a first column of said plurality of columns; water washing said first sample so as to remove furfural therefrom; passing ultraviolet light from a source of ultraviolet light through at least a portion of said first water washed sample; measuring the quantity of ultraviolet light transmitted by said first sample; automatically adjusting the heat input to said first column in response to said measurement so as to maintain a predetermined concentration of butadiene at the selected point in said first column; withdrawing a second vapor sample from the corresponding point in a second column of said plurality of columns; water washing said second sample so as to remove furfural therefrom; passing ultraviolet light from said ultraviolet light source through at least a portion of said second water washed sample; measuring the quantity of ultraviolet light transmitted by said second sample; automatically adjusting the heat input to said second column in response to said measurement so as to maintain a predetermined concentration of butadiene at the selected point in said second column; continuing to withdraw a vapor sample from the corresponding point in each of said columns of said plurality of columns and adjusting the heat input thereto until all of said columns have been sampled and then repeating the cycle; withdrawing a furfural stream from the bottom of each of said columns, said furfural stream containing the major portion of the butadiene present in the feed to each of said columns.

References Cited in the file of this patent
UNITED STATES PATENTS

| Number | Name | Date |
|---|---|---|
| 1,759,996 | Parker | May 27, 1930 |
| 2,246,563 | Winters | June 24, 1941 |
| 2,386,830 | Wright | Oct. 16, 1945 |
| 2,386,831 | Wright | Oct. 16, 1945 |
| 2,415,006 | Hachmuth | Jan. 28, 1947 |
| 2,459,404 | Anderson | Jan. 18, 1949 |
| 2,462,946 | Coggeshall | Mar. 1, 1949 |
| 2,462,995 | Ritzmann | Mar. 1, 1949 |
| 2,499,626 | Bowman | Mar. 7, 1950 |